United States Patent
Ryu et al.

(10) Patent No.: US 10,991,964 B2
(45) Date of Patent: Apr. 27, 2021

(54) FUEL CELL SYSTEM AND METHOD OF CONTROLLING THE SAME

(71) Applicant: Hyundai Motor Company, Seoul (KR)

(72) Inventors: Jung Hwan Ryu, Gyeonggi-do (KR); Soon Il Jeon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 1164 days.

(21) Appl. No.: 15/382,928

(22) Filed: Dec. 19, 2016

(65) Prior Publication Data
US 2017/0365868 A1 Dec. 21, 2017

(30) Foreign Application Priority Data
Jun. 17, 2016 (KR) .......... 10-2016-0075667

(51) Int. Cl.
| | | |
|---|---|---|
| H01M 8/04 | (2016.01) | |
| H01M 8/04992 | (2016.01) | |
| H01M 8/04701 | (2016.01) | |
| H01M 8/04746 | (2016.01) | |
| H01M 8/04029 | (2016.01) | |
| H01M 8/04089 | (2016.01) | |
| H01M 8/04791 | (2016.01) | |
| H01M 8/04828 | (2016.01) | |

(52) U.S. Cl.
CPC ... *H01M 8/04992* (2013.01); *H01M 8/04029* (2013.01); *H01M 8/04089* (2013.01); *H01M 8/04701* (2013.01); *H01M 8/04731* (2013.01); *H01M 8/04746* (2013.01); *H01M 8/04768* (2013.01); *H01M 8/04798* (2013.01); *H01M 8/04828* (2013.01); *H01M 2250/20* (2013.01)

(58) Field of Classification Search
CPC ......... H01M 8/04992; H01M 8/04029; H01M 8/04089; H01M 8/04701; H01M 8/04731; H01M 8/04746; H01M 8/04768; H01M 8/04798; H01M 8/04828; H01M 2250/20
See application file for complete search history.

(56) References Cited

U.S. PATENT DOCUMENTS 7,569,293 B1 * 8/2009 Cross, III ............ H01M 8/0488
429/412

FOREIGN PATENT DOCUMENTS

| | | |
|---|---|---|
| JP | H10-144355 A | 5/1998 |
| JP | 2006-244966 A | 9/2006 |
| JP | 2007-328995 A | 12/2007 |
| JP | 2008-098134 A | 4/2008 |
| KR | 10-1362740 31 | 2/2014 |
| KR | 2016-0036422 A | 4/2016 |

* cited by examiner

*Primary Examiner* — Jane J Rhee
(74) *Attorney, Agent, or Firm* — Mintz Levin Cohn Ferris Glovsky; Peter F. Corless

(57) ABSTRACT

A fuel cell system having a fuel cell control module (FCU) and a method of controlling the same are provided. The method includes selecting one of at least one control parameter and learning system efficiency at each of at least one configurable candidate value of the selected control parameter based on supplied current by driving the fuel cell system. Additionally, the method includes determining a value of the selected control parameter by comparing the system efficiency at each of the at least one configurable candidate value of the selected control parameter with system efficiency corresponding to an initial performance index, at each of at least one predetermined representative current point. Thereby, efficiency of the fuel cell system is improved.

22 Claims, 6 Drawing Sheets

FUEL CELL SYSTEM AND METHOD OF CONTROLLING THE SAME

CROSS REFERENCE TO RELATED APPLICATION(S)

This application claims the benefit of Korean Patent Application No. 10-2016-0075667, filed on Jun. 17, 2016, which is hereby incorporated by reference as if fully set forth herein.

BACKGROUND

Field of the Invention

The present disclosure relates to a fuel cell system mounted within a vehicle and a method of controlling the same, and more particularly, to a fuel cell system with improved fuel efficiency.

Discussion of the Related Art

A fuel cell vehicle includes a fuel cell stack used as a power source, in which a plurality of fuel cells are stacked, a fuel supply system (a hydrogen supply system) configured to supply a fuel, i.e., hydrogen, to the fuel cell stack, an air supply system configured to supply an oxidant necessary for electrochemical reaction, i.e., oxygen, and a thermal management system configured to adjust the temperature of the fuel cell stack. In addition, the hydrogen supply system adjusts the pressure of high-pressure hydrogen stored in a hydrogen tank using a regulator and then supplies the pressure-controlled hydrogen to the fuel cell stack, and the air supply system humidifies air supplied by an air blower and then supplies the humidified air to the fuel cell stack.

Further, the fuel cell vehicle uses an electric motor as a driving source to drive the vehicle, and has an inverter which converts direct current (DC) voltage of the fuel cell stack or a battery into alternating current (AC) voltage and then drives the electric motor using the AC voltage. The fuel supply system decompresses compressed hydrogen in the hydrogen tank and then supplies the decompressed hydrogen to a fuel electrode (an anode) of the stack, and the air supply system supplies external air, suctioned by operating the air blower, to an air electrode (a cathode) of the stack.

When hydrogen is supplied to the anode of the stack and air is supplied to the cathode of the stack, protons are separated from the anode through catalyst reaction. The separated protons are transmitted to the cathode through an electrolyte membrane, the protons separated from the anode, electrons and oxygen cause electrochemical reaction at the cathode, and electrical energy may be acquired therethrough. In particular, electrochemical oxidation of hydrogen occurs at the anode, electrochemical reduction of oxygen occurs at the cathode, movement of produced electrons generates electricity and heat, and vapor or water is produced by chemical reaction, i.e., bonding between hydrogen and oxygen.

A discharge device configured to discharge byproducts, such as vapor, water and heat produced during the electrical energy generation process of the fuel cell stack, and non-reacted hydrogen and oxygen is provided, and gases, such as vapor, hydrogen and oxygen, are discharged to the atmosphere through an exhaust passage. Performance of the fuel cell system is influenced by manufacturing variations and external environments. The fuel cell system may have efficiency that varies based on various control parameters and numerical values of the control parameters. Particularly, control parameters may include temperature, pressure, relative humidity, a hydrogen supply degree, etc. which may influence efficiency of the fuel cell system. When the fuel cell system uses control parameters determined through calibration in a vehicle manufacture and development stage, it may be difficult to achieve the maximum efficiency. Efficiency of the fuel cell system will be exemplarily described with reference to FIG. 1.

FIG. 1 is a graph representing efficiency of a fuel cell system according to supplied current according to the related art. In FIG. 1, the X-axis represents the amount of current supplied to the fuel cell system and the Y-axis represents efficiency of the fuel cell system. On the assumption that a control parameter is relative humidity (RH), RH0 indicates Base Of Life (BOL), i.e., an initial performance index, and RH1 and RH2 represent relative humidity values set to differ from BOL by designated values. Relative humidity of RH1 represents the highest efficiency in a region 1 and relative humidity of RH2 represents the highest efficiency in a region 2. When relative humidity is set to be RH1, efficiency is high in a specific region, i.e., the region 1, and is low in other regions than the specific region and thus the fuel cell system may be degraded. Even high efficiency in the specific region may have a negative influence on the fuel cell system. In the case of relative humidity of RH0 or RH2, the same effect is achieved. Therefore, a method of improving efficiency of a fuel cell system is required.

SUMMARY

Accordingly, the present disclosure provides a fuel cell system and a method of controlling the same that substantially obviate one or more problems due to limitations and disadvantages of the related art. An object of the present disclosure is to provide a method of improving efficiency of a fuel cell system in the entire current region and not in a specific voltage region.

Another object of the present disclosure is to provide a fuel cell system having improved efficiency in which driver characteristics are reflected. Yet another object of the present disclosure is to provide a method of improving efficiency of a fuel cell system by learning, in consideration of manufacture variations and driving condition variations.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of controlling a fuel cell system may include selecting one of at least one control parameter, learning system efficiency at each of at least one configurable candidate value of the selected control parameter according to supplied current by driving the fuel cell system, and determining a value of the selected control parameter by comparing the system efficiency at each of the at least one configurable candidate value of the selected control parameter with system efficiency corresponding to an initial performance index, at each of at least one predetermined representative current point.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate exemplary embodiment(s) of the disclosure and together with the description serve to explain the principle of the disclosure. In the drawings.

DETAILED DESCRIPTION

Figure 1:
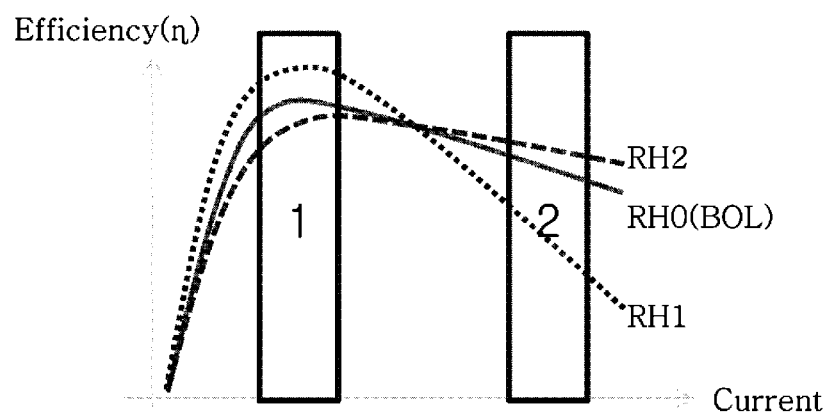
FIG. 1 is a graph representing problems caused by a conventional fuel cell system according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present disclosure, examples of which are illustrated in the accompanying drawings.

In the following description of the embodiments, it will be understood that, when each element is referred to as being "on (above) or under (below)" or "in front of or at the rear of" another element, the two elements may directly contact or one or more other elements may be interposed between the elements. Further, the terms "first", "second", "A", "B", "(a)", "(b)", etc., may be used to describe elements of the present disclosure. These terms are used only to distinguish the corresponding elements from other elements but do not limit the nature, order or sequence of the corresponding elements. In addition, it will be understood that, when one element is referred to as being "connected to", "combined with" or "coupled with" another element, it may be directly "connected to", "combined with" or "coupled with" the other element or intervening elements may also be present therebetween.

All terms including technical or scientific terms have the same meanings as generally understood by those skilled in the art, unless stated otherwise. Generally used terms, such as terms defined in dictionaries, should be interpreted as having meanings coinciding with contextual meanings in the related technology and are not interpreted as having ideal or excessively formal meanings, unless defined clearly in the present disclosure.

Figure 2:
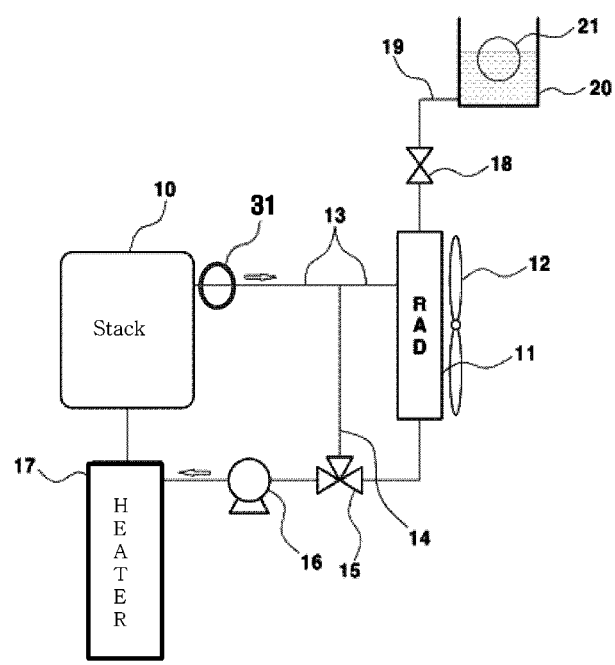
FIG. 2 is a view illustrating a structure of a fuel cell system in accordance with one exemplary embodiment of the present disclosure.

FIG. 2 is a view illustrating one exemplary structure of a fuel cell system. As exemplarily shown in FIG. 2, a fuel cell system may include a radiator 11 and a radiator fan 12 configured to emit heat of cooling water to the outside, a cooling water circulation line 13 that connects a fuel cell stack 10 and the radiator 11 to circulate cooling water between the fuel cell stack 10 and the radiator 11, a bypass line 14 and a 3-way valve 15 to selectively divert cooling water to not pass through the radiator 11, and a water pump 16 configured to pump cooling water to circulate cooling water.

In such a fuel cell cooling device, the water pump 16 may be driven to circulate cooling water along the cooling water circulation line 13 among the fuel cell stack 10, the radiator 11 and the 3-way valve 15 and to emit heat generated during power generation by the fuel cell stack 10 to the outside through the radiator 11. Further, in the above water cooling device, the radiator fan 12 may be driven during circulation of cooling water to cool the fuel cell stack 10, and the radiator 11 may be configured to discharge heat from cooling water to the outside through heat exchange with outdoor air introduced by the radiator fan 12 or traveling wind.

During such a process, a controller (not shown) may be configured to receive a stack temperature detected by a sensor, and operate the water pump 16, the radiator fan 12, the 3-way valve 15, etc. to maintain the stack temperature at a target temperature when cooling of the fuel cell stack 10 is required, thereby cooling the fuel cell stack 10 using cooling water. Further, a heater 17, configured to heat cooling water introduced into the fuel cell stack 10 to rapidly increase the temperature of the fuel cell stack 10 to a proper operating temperature, may be mounted on the cooling water circulation line 13.

When the temperature of the fuel cell stack 10 is low (e.g., less than a predetermined temperature), the opening direction of the 3-way valve 15 may be operated to cut off or block cooling water discharged from an outlet of the radiator 11, the water pump 16 may be configured to suction, pump and circulate cooling water through the bypass line 14, and simultaneously the heater 17 may be operated to heat cooling water introduced into the fuel cell stack 10, thereby rapidly heating (e.g., increasing the temperature of) the fuel cell stack 10. Further, a cooling water supplement line 19 may be interposed between the radiator 11 and a reservoir 20 and may be connected to the upper end of the radiator 11 through a pressure cap 18. The reservoir 20 configured to store cooling water may have an atmosphere open-ended structure and a water level sensor 21 may be mounted in the reservoir 20.

In such a configuration, when cooling water of a stack cooling loop is lost, negative pressure is applied to a front end line of the water pump 16 and cooling water in the reservoir 20 may be introduced into the radiator 11 through the cooling water supplement line 19 and the pressure cap 18 and thus compensates for lost cooling water.

A fuel cell control unit (FCU) (e.g., a general controller) may be configured to operate the fuel cell system. The FCU is a high-level controller configured to adjust cooling water temperature, operate the fuel cell stack 10, turn various modules on and off, etc. The fuel cell system in accordance with the present disclosure is not limited to FIG. 2.

Figure 3:
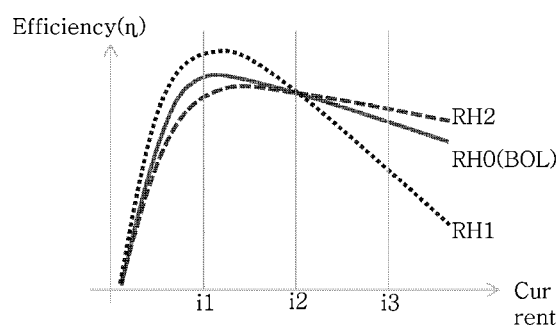
FIG. 3 is a graph representing efficiency according to supplied current in accordance with one exemplary embodiment of the present disclosure.

FIG. 3 is a graph representing efficiency according to supplied current in accordance with one exemplary embodiment of the present disclosure. When a specific control parameter of the fuel cell system is selected, the FCU may be configured to check initial performance (BOL, first performance) of the control parameter (e.g., relative humidity RH) through calibration and at least one performance (e.g., second performance, third performance, etc.) of the same control parameter differing from the initial performance by a designated range while driving the fuel cell system (learning control). At least one performance except for the initial performance (BOL) may include fourth performance and higher performances, or include only second performance.

Further, the FCU may be configured to adjust efficiency based on the at least one checked performance of the control parameter. The FCU may further be configured to prevent efficiency of the fuel cell system from increasing only in a specific section (e.g., a section in which efficiency reaches a peak only at specific supplied current). For this purpose, the FCU may be configured to set representative current points (e.g., i1, i2 and i3) and calculate efficiency of the fuel cell system based on Equation 1 below.

$$\Delta \eta in = \eta ParN\_in - \eta BOL\_in, n=1,2,3, N=1,2 \qquad \text{Equation 1}$$

wherein $\eta BOL\_in$ indicates initial performance efficiency at a representative current point and $n\Delta\eta in$ indicates a BOL efficiency difference, on the assumption that there are 3 representative current points and there are 2 performances (N being 1 and 2) except for initial performance efficiency $$\Delta \eta t = \Delta \eta i1 + \Delta \eta i2 + \Delta \eta i3$$

wherein $\Delta \eta t$ is gross efficiency difference and $\Delta \eta in$ is efficiency difference at a representative current point n.

On the assumption that a control parameter is relative humidity RH, the FCU may be configured to select the value of a target control parameter, in which $\Delta \eta t$ becomes the maximum, as the optimum value. For example, $\Delta \eta i1 = \eta RH1\_i1 - \eta BOL\_i1$ (first formula), $\Delta \eta i1 = \eta RH2\_i1 - \eta BOL\_i$ (second formula), $\Delta \eta i2 = \eta RH1\_i2 - \eta BOL\_i2$ (third formula), $\Delta \eta i2 = \eta RH2\_i2 - \eta BOL\_i$ (fourth formula), $\Delta \eta i3 = \eta RH3\_i3 - \eta BOL\_i3$ (fifth formula), $\Delta = \eta i3 = \eta RH2\_i3 - \eta BOL\_i$ (sixth formula), and $\Delta \eta t$ may be gross efficiency acquired by adding values of the first to sixth formulae.

According to the above Equation 1, a control parameter in which an efficiency peak occurs only at a specific voltage is not selected and thus the fuel cell system may be stably operated with high efficiency.

Figure 4:
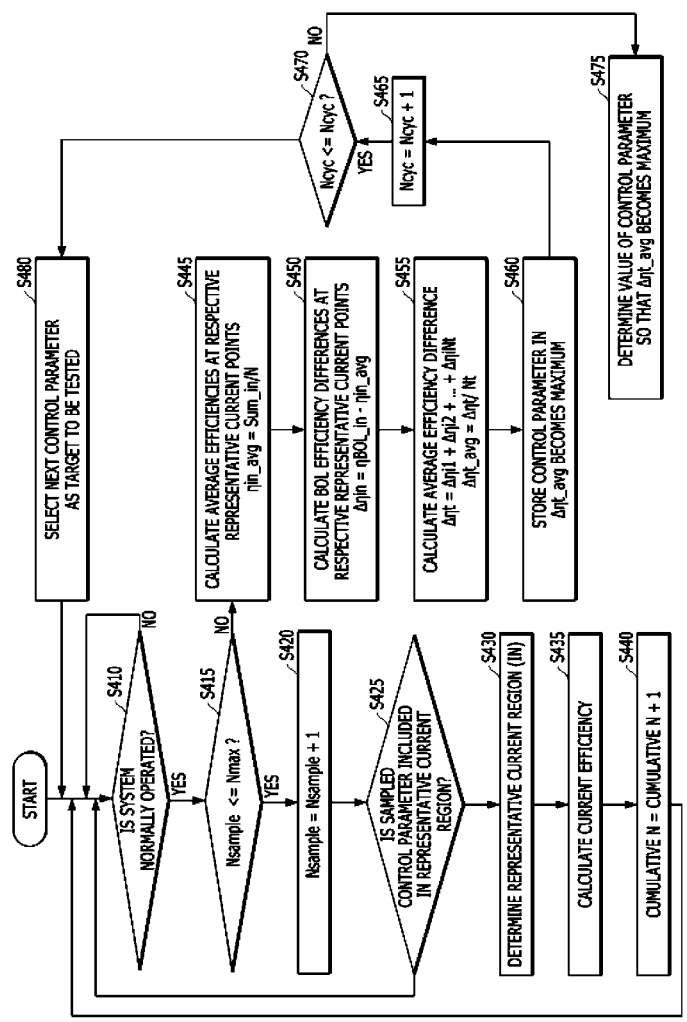
FIG. 4 is a flowchart illustrating a method of controlling a fuel cell system in accordance with one exemplary embodiment of the present disclosure.

Hereinafter, the fuel cell system in which the above Equation 1 is implemented concretely will be described in detail. FIG. 4 is a flowchart illustrating a method of controlling a fuel cell system in accordance with one exemplary embodiment of the present disclosure. Particularly, control of a fuel cell is generally executed by a fuel cell control unit (FCU).

First, the fuel cell system may be configured to determine whether the fuel cell system is operated normally (Operation S410). In particular, the fuel cell system may be configured to determine whether various conditions, such as temperature, pressure, current, humidity, etc. of the fuel cell system, are normal (e.g., within normal operating ranges). In response to determining that the fuel cell system is operated normally (e.g., without error), the fuel cell system may be configured to execute learning (test) of a specific control parameter.

The fuel cell system may be configured to select a specific control parameter as a target factor to be learned (tested). Control parameters may include at least one of temperature, pressure and relative humidity of the fuel cell stack 10, a hydrogen or oxygen concentration and an amount of cooling water in the fuel cell stack 10, a driving time of a motor, a driving intensity of the motor, etc., and various factors influencing driving of the fuel cell system may be selected as the control parameters. When a specific control parameter is selected, the fuel cell system may be configured to execute sampling of the specific control parameter. The fuel cell system may specifically be configured to collect performance indexes that satisfy sampling conditions (e.g., specific efficiency that corresponds to a specific value of the specific control parameter).

Further, the fuel cell system may be configured to execute sampling of the specific control parameter until the number of times of sampling ($N_{sample}$) of the specific control parameter does not exceed the maximum number of times of sampling ($N_{max}$) (Operation S420). When the sampled control parameter is within a representative current region (Operation S425), the fuel cell system may be configured to determine the control parameter as a number ($i_n$) of the representative current region (Operation S430). For example, numbers ($i_n$) of representative current regions may be $i_1$, $i_2$, $i_3$, etc. The numbers and current intensities of representative current regions may be predetermined or be set by user input at a test stage.

When the number of times of sampling ($N_{sample}$) of the specific control parameter exceeds the maximum number of times of sampling ($N_{max}$), the fuel cell system may be configured to temporarily stop the test (learning) and execute analysis for system efficiency. First, the fuel cell system may be configured to calculate average efficiencies at the respective representative current points (Operation S445).

The fuel cell system may further be configured to calculate the average efficiencies at the respective representative current points by dividing accumulated efficiencies by integrated values of data. Thereafter, the fuel cell system may be configured to calculate efficiency differences between the average efficiencies at the respective representative current points and an initial performance index (BOL) (Operation S450).

Thereafter, the fuel cell system may be configured to calculate an average efficiency difference by adding all the efficiency differences between the average efficiencies at the respective representative current points and the initial performance index (BOL) (Operation S455). The fuel cell system may then be configured to store the control parameter having the maximum average efficiency difference using an optimization algorithm (Operation S460).

Additionally, the fuel cell system may be configured to add 1 to the current test (learning) cycle number (Operation S465), determine whether the current test cycle number exceeds the maximum test cycle number (Operation S470), select a next control parameter as a target factor to be learned (Operation S480) in response to determining that the current test cycle number does not exceed the maximum test cycle number, and finally determine the stored control parameter in which the average efficiency difference becomes the maximum and determine a value of the control parameter (Operation S475) in response to determining that the current test cycle number exceeds the maximum test cycle number. Accordingly, the fuel cell system may be operated by the controller based on the control parameter value related to the maximum efficiency. Accordingly, the fuel cell vehicle may be driven with improved fuel efficiency.

Figure 5:
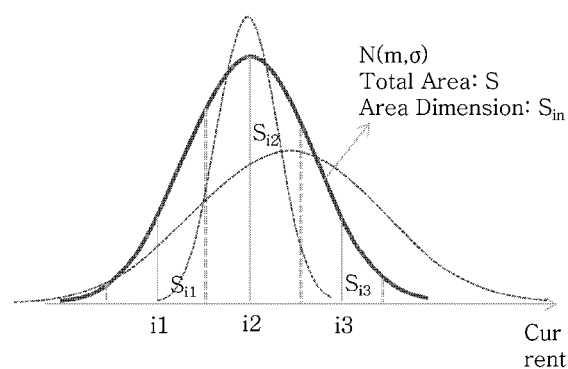
FIG. 5 is a graph representing cumulative probability distribution of efficiencies measured at representative current points in accordance with one exemplary embodiment of the present disclosure.

Hereinafter, a method of increasing system efficiency by adding in consideration of a usage pattern of stack current to the method described with reference to FIGS. 3 and 4 will be described with reference to FIGS. 5 and 6. FIG. 5 is a graph representing cumulative probability distribution of efficiencies measured at representative current points in accordance with one exemplary embodiment of the present disclosure.

In the same manner as in FIG. 3, when a specific control parameter of the fuel cell system is selected, the FCU may be configured to check or detect initial performance (BOL, first performance) of the control parameter (e.g., relative humidity RH) using calibration and at least one performance (e.g., second performance, third performance, etc.) of the same control parameter differing from the initial performance by a designated range while operating the fuel cell system (learning control).

Further, the FCU may be configured to adjust efficiency based on the at least one checked performance of the control parameter. The FCU may be configured to prevent efficiency of the fuel cell system from increasing only in a specific section (e.g., a section in which efficiency reaches a peak only at a specific supplied current). For this purpose, the FCU may be configured to set representative current points (e.g., $i_1$, $i_2$ and $i_3$) and calculate efficiency of the fuel cell system based on Equation 1 above and Equation 2 below.

$$Ain = Sin/S, n=1,2,3 \text{ (on the assumption that there are 3 representative current points)}$$

$$\Delta\eta in = Ain \times (\eta RHN\_in - \eta BOL\_in)$$

$$\Delta\eta t = \Delta\eta i1 + \Delta\eta i2 + \Delta\eta i3 \qquad \text{Equation 2}$$

wherein, $A_{in}$ represents a weighting factor of probability distribution $A_n$ of a corresponding region at each of the representative current points. In an entire event region S, when current at a specific representative current point is X, $A_{in}$ may be $A_{ix}$ and $A_{ix}$ may be $S_{ix}/S$.

An efficiency difference $\Delta\eta in$ at each representative current point may be calculated by multiplying ($\eta RHN\_in - \eta BOL\_in$) and Ain (when the control parameter is relative humidity). Particularly, the value of the target control parameter, in which $\Delta\eta t$ becomes the maximum, may be selected as the optimum value. Accordingly, optimization of the target control parameter in a specific current region may be avoided and thus, efficiency of the system may be improved.

Figure 6:
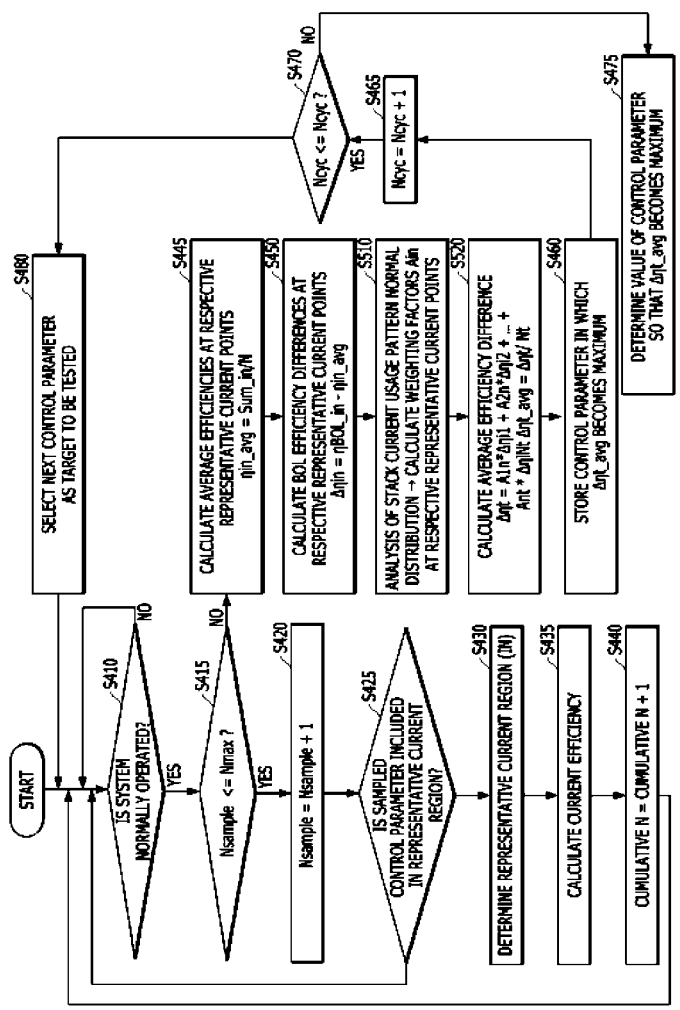
FIG. 6 is a flowchart illustrating a method of controlling a fuel cell system in consideration of a stack current usage pattern in accordance with another exemplary embodiment of the present disclosure.

FIG. 6 is a flowchart illustrating a method of controlling a fuel cell system based on a stack current usage pattern in accordance with another exemplary embodiment of the present disclosure. Only differences of the above method from the method shown in FIG. 4 will be described.

Particularly, the fuel cell system may be configured to calculate $A_{in}$, i.e., a weighting factor at each representative current point by analyzing probability distribution (e.g., normal distribution) of a stack current usage pattern (Operation 510). Then, the fuel cell system may be configured to calculate an average efficiency difference $\Delta\eta t\_avg$ based on the weighting factor. When the above weighting factor is used, even when drivers have driving tendencies of different patterns, different control parameter values according to the driver may be set. Accordingly, a user-adaptive control parameter of the fuel cell system may be set. Therefore, efficiency of the fuel cell system in which driver characteristics are reflected may be maximized Control parameters used in the present disclosure may be set through a genetic algorithm or Particle Swarm Optimization (PSO) among fuel cell performance optimization technologies.

The method in accordance with the above-described exemplary embodiment may be implemented as a computer executable program and stored in a non-transitory computer readable recording medium. The non-transitory computer readable recording medium may be one of a ROM, a RAM, a CD-ROM, a magnetic tape, a floppy disk, an optical data storage device, etc. Further, the non-transitory computer readable recording medium may be realized in the form of a carrier wave (for example, transmission over the Internet).

The non-transitory computer readable recording medium may be distributed to computer systems connected by a network and be stored and executed as code which is readable by computers in a distributed manner. Further, functional programs, code and code segments to implement the above-described method may be easily deduced by programmers in the art to which the embodiments pertain.

As apparent from the above description, a fuel cell system and a method of controlling the same in accordance with various exemplary embodiments of the present disclosure have effects, as follows.

The method of controlling the fuel cell system in accordance with one exemplary embodiment of the present disclosure may improve efficiency of the fuel cell system in the entire current region not merely in a specific voltage region.

Further, the fuel cell system in accordance with one exemplary embodiment of the present disclosure may have improved efficiency in which driver characteristics are reflected, thereby preventing decrease of efficiency of the fuel cell system according to variations of driving environments and improving user convenience.

Moreover, the fuel cell system may improve efficiency in consideration of manufacturing variations, thereby improving efficiency and durability of the fuel cell system.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A method of controlling a fuel cell system, comprising:
selecting, by a controller, a first control parameter;
learning, by the controller, system efficiency at each of at least one configurable candidate value of the first selected control parameter based on supplied current by driving the fuel cell system; and
determining, by the controller, a value of the first selected control parameter by comparing the system efficiency at each of the at least one configurable candidate value of the selected control parameter with system efficiency corresponding to an initial performance index, at each of at least one predetermined representative current point,
wherein the determination of the value of the first selected control parameter further includes calculating, by the controller, a base of life (BOL) efficiency difference at each of the at least one predetermined current point.

2. The method according to claim 1, wherein the learning of system efficiency includes:
preventing, by the controller, the number of sampling data of the selected parameter from exceeding the maximum number of sampling data; and
calculating, by the controller, system efficiencies at candidate values of the at least one predetermined representative current point including each of the sampling data when each of the sampling data is included in the at least one predetermined representative current point.

3. The method according to claim 2, wherein the learning of system efficiency further includes:
adding, by the controller, the calculated system efficiencies at the candidate values of the at least one predetermined representative current point to the gross system efficiency of the least one predetermined representative current point; and
increasing, by the controller, the number of the at least one predetermined representative current point by one.

4. The method according to claim 3, wherein the determination of the value of the first selected control parameter includes:
calculating, by the controller, average efficiency at each of the at least one predetermined representative current point based on the equation below, $$\eta in\_avg = Sum\_\eta in / Nin,$$

wherein $\eta in\_avg$ indicates average efficiency at a representative current point n, $Sum\_\eta in$ indicates the gross system efficiency, $Nin$ indicates the number of the at least one predetermined representative current point, and $n = (1, 2, 3, \ldots)$.

5. The method according to claim 4, wherein the calculation of the base of life (BOL) efficiency difference is carried out based on the equation below, $$\Delta\eta in = \eta BOL\_in - \eta in\_avg,$$

wherein $\Delta\eta in$ indicates system efficiency at each of the candidate values of the representative current point n, $\eta BOL\_in$ indicates initial performance efficiency at the representative current point n, $\Delta\eta in$ indicates the BOL efficiency difference, and $n = (1, 2, 3, \ldots)$.

6. The method according to claim 5, wherein the determination of the value of the first selected control parameter further includes:
calculating, by the controller, a gross average efficiency difference based on the equation below, $$\Delta\eta t = \Delta\eta i1 + \Delta\eta i2 + \Delta\eta iNt$$

$$\Delta\eta t\_avg = \Delta\eta t / Nt,$$

wherein $Nt$ indicates the number of representative current points, $\Delta\eta t$ indicates a gross efficiency difference, and $\Delta\eta t\_avg$ indicates the gross average efficiency difference.

7. The method according to claim 6, further comprising:
storing, by the controller, the first selected control parameter in which the gross average efficiency difference becomes the maximum.

8. The method according to claim 7, further comprising:
selecting, by the controller, a second control parameter different from the first selected control parameter.

9. The method according to claim 5, wherein the determination of the value of the first selected control parameter further includes:
calculating, by the controller, a weighting factor at each of the at least one predetermined representative current point based on a stack current usage pattern; and
calculating, by the controller, a gross average efficiency difference based on Equation 6 below, $$\Delta\eta t = Ai1 * \Delta\eta i2 + \ldots + AiNt * \Delta\eta iNt$$

$$\Delta nt\_avg = \Delta nt / Nt,$$

wherein $Ain$ indicates a weighting factor at the representative current point n.

10. The method according to claim 9, further comprising:
storing, by the controller, the first selected control parameter in which the gross average efficiency difference becomes the maximum;
selecting, by the controller, a second control parameter different from the first selected control parameter; and
storing the second selected control parameter in which the gross average efficiency difference becomes the maximum.

11. The method according to claim 2, wherein the maximum number of sampling data is set in consideration of performance of the fuel cell system.

12. The method according to claim 1, wherein, in the selection of the first control parameter, the first control parameter is selected based on priority influencing the fuel cell system or is selected based on user setup.

13. The method according to claim 1, wherein, in the learning of system efficiency, the at least one configurable candidate value of the first selected control parameter differs from an initial performance value of the first selected control parameter by a designated value.

14. The method according to claim 1, wherein the at least one predetermined representative current point is selected with a difference of a predetermined current value or is selected by user input.

15. The method according to claim 1, wherein the first control parameter includes at least one selected from the group consisting of: a temperature, pressure and relative humidity of a fuel cell stack, a hydrogen or oxygen concentration and an amount of cooling water in the fuel cell stack, a driving time of a motor, and a driving intensity of the motor.

16. A fuel cell system comprising a fuel cell control module (FCU), wherein the FCU is configured to:
   select a first control parameter and learn system efficiency at each of at least one configurable candidate value of the first selected control parameter based on supplied current by driving the fuel cell system; and
   determine a value of the first selected control parameter by comparing the system efficiency at each of the at least one configurable candidate value of the first selected control parameter with system efficiency that corresponds to an initial performance index, at each of at least one predetermined representative current point,
   wherein the FCU is configured to calculate a base of life (BOL) efficiency difference at each of the least one predetermined representative current point for determining the value of the first selected control parameter.

17. The fuel cell system according to claim 16, wherein the FCU is further configured to:
   calculate system efficiencies at candidate values of the at least one predetermined representative current point including each of the sampling data when each of the sampling data is included in the at least one predetermined representative current point; and
   add the calculated system efficiencies at the candidate values of the at least one predetermined representative current point to the gross system efficiency of the least one predetermined representative current point, and increase the number of the at least one predetermined representative current point by one.

18. The fuel cell system according to claim 17, wherein the FCU is configured to calculate average efficiency at each of the at least one predetermined representative current point based on the equation below, $\eta in\_avg = Sum\_\eta in / Nin,$ wherein $\eta in\_avg$ indicates average efficiency at a representative current point n, $Sum\_\eta in$ indicates the gross system efficiency, Nin indicates the number of the at least one predetermined representative current point, and n=(1, 2, 3, ... ).

19. The fuel cell system according to claim 18, wherein the FCU is configured to calculate base of life (BOL) efficiency difference at each of the at least one predetermined representative current point based on the equation below, $\Delta \eta in = \eta BOL\_in - \eta in\_avg,$ wherein $\Delta \eta in$ indicates system efficiency at each of the candidate values of the representative current point n, $\eta BOL\_in$ indicates initial performance efficiency at the representative current point n, $\Delta \eta in$ indicates the BOL efficiency difference, and n=(1, 2, 3, ... ).

20. The fuel cell system according to claim 19, wherein the FCU is configured to calculate a gross average efficiency difference based on the equation below, $\Delta \eta t = \Delta \eta i1 + \Delta \eta i2 + \ldots + \Delta \eta iNt$ $\Delta \eta t\_avg = \Delta \eta t / Nt,$ wherein Nt indicates the number of representative current points, $\Delta \eta t$ indicates a gross efficiency difference, and $\Delta \eta t\_avg$ indicates the gross average efficiency difference.

21. The fuel cell system according to claim 19, wherein the FCU is further configured to:
   calculate a weighting factor at each of the at least one predetermined representative current point based on a stack current usage pattern; and
   calculate a gross average efficiency difference based on the equation below, $\Delta \eta t = Ai1 * \Delta \eta i1 + Ai2 * \Delta \eta i2 + \ldots + AiNt * \Delta \eta iNt$ $\Delta \eta t\_avg = \Delta \eta t / Nt,$ wherein Ain indicates a weighting factor at the representative current point n.

22. The fuel cell system according to claim 21, further comprising a storage unit in the FCU is configured to store the first selected control parameter in which the gross average efficiency difference becomes the maximum within the storage unit.

* * * * *